United States Patent [19]

Harder et al.

[11] Patent Number: 5,594,925
[45] Date of Patent: Jan. 14, 1997

[54] METHOD AND APPARATUS DETERMINING ORDER AND IDENTITY OF SUBUNITS BY INPUTTING BIT SIGNALS DURING FIRST CLOCK PERIOD AND READING CONFIGURATION SIGNALS DURING SECOND CLOCK PERIOD

[75] Inventors: Stanley D. Harder, Garland, Tex.; Richard A. Houghton, Cocoa Beach, Fla.; Richard H. Wallace, Plano, Tex.

[73] Assignee: Texas Instruments Incorporated, Dallas, Tex.

[21] Appl. No.: 755

[22] Filed: Jan. 5, 1993

[51] Int. Cl.⁶ .................................................. H01J 3/00
[52] U.S. Cl. .................................. 395/863; 395/836
[58] Field of Search ........................ 395/275, 827, 395/844, 845, 863, 865, 878, 836, 837

[56] References Cited

U.S. PATENT DOCUMENTS

| | | | |
|---|---|---|---|
| 3,623,001 | 11/1971 | Kleist | 340/172.5 |
| 4,516,201 | 5/1985 | Warren et al. | 395/200 |
| 4,615,019 | 9/1986 | Bonci | 395/225 |
| 4,617,566 | 10/1986 | Diamond | 340/870.11 |
| 4,642,791 | 2/1987 | Mallozzi et al. | 395/891 |
| 4,721,958 | 1/1988 | Jenkin | 342/13 |
| 4,920,511 | 4/1990 | Brier et al. | 395/822 |
| 4,964,038 | 10/1990 | Louis et al. | 395/225 |
| 5,179,670 | 1/1993 | Farmwald et al. | 395/325 |
| 5,265,124 | 11/1993 | Staab et al. | 375/3 |
| 5,287,531 | 2/1994 | Rogers, Jr. et al. | 395/800 |
| 5,341,480 | 8/1994 | Wasserman et al. | 395/325 |
| 5,357,542 | 10/1994 | Suzuki | 375/3 |
| 5,414,744 | 5/1995 | Levy | 377/75 |
| 5,493,239 | 2/1996 | Zlotnick | 326/38 |

*Primary Examiner*—Thomas C. Lee
*Assistant Examiner*—Sang Hui Kim
*Attorney, Agent, or Firm*—Ronald O. Neerings; William E. Hiller; Richard L. Donaldson

[57] ABSTRACT

A unit train (10) includes a base unit (12). Base unit (12) generates a clock signal and a bit signal. Base unit (12) also receives and interprets a data signal. Unit train (10) also includes a plurality of subunits (14) serially coupled in a certain order. Each subunit (14) receives the clock signal and the bit signal. Each subunit (14) also generates a portion of the data signal. Additionally each of the subunits (14) has a corresponding identity. Also included in the unit train (10) is a clock/data line (67) for relaying the clock signal and the data signal between the base unit (12) and each subunit (14).

12 Claims, 5 Drawing Sheets

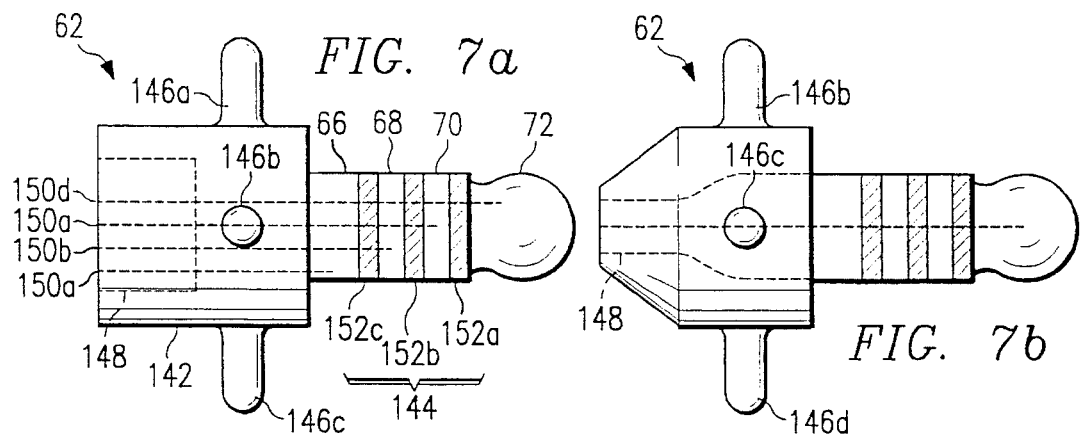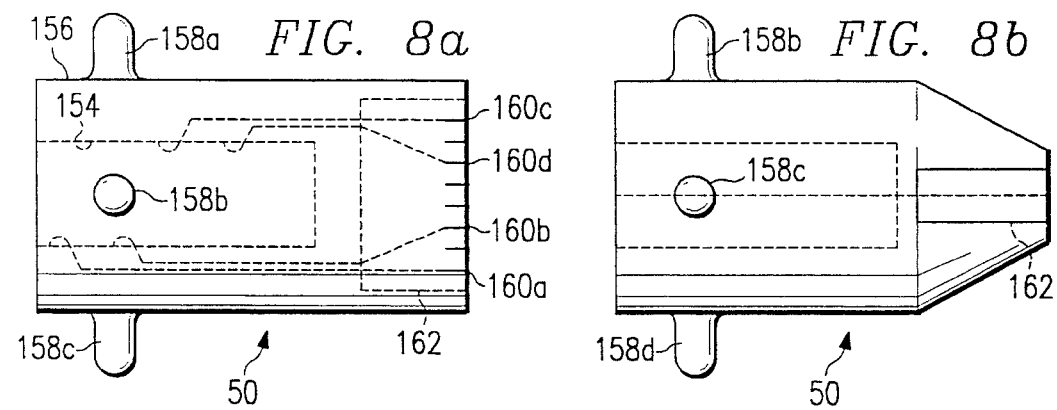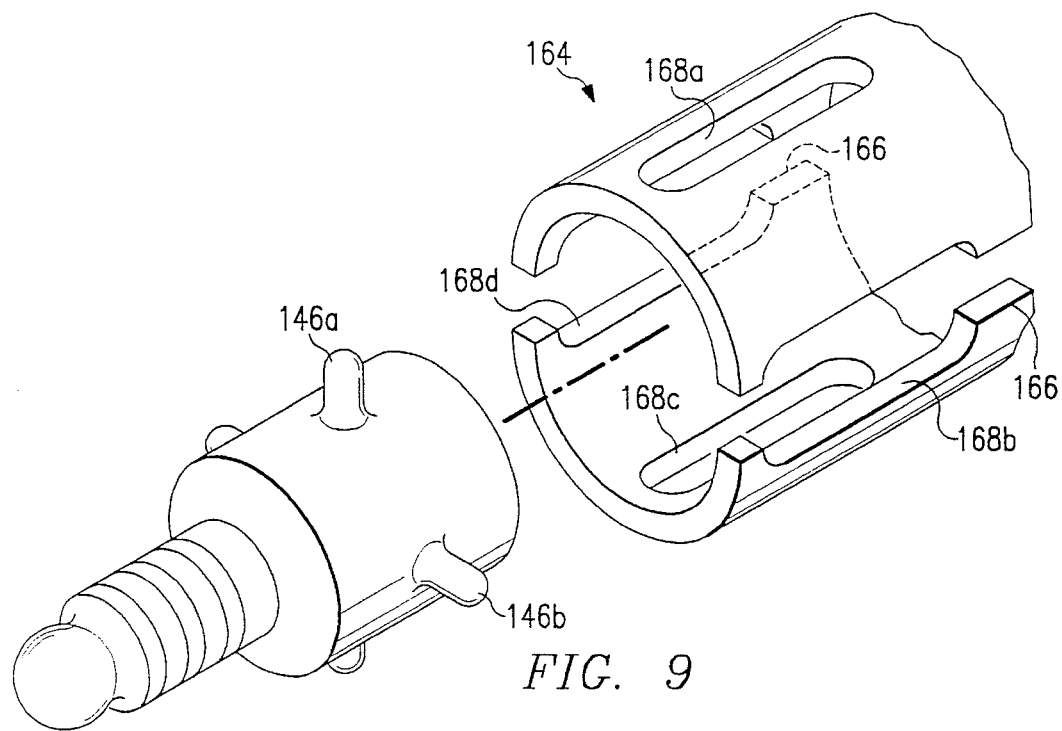

METHOD AND APPARATUS DETERMINING ORDER AND IDENTITY OF SUBUNITS BY INPUTTING BIT SIGNALS DURING FIRST CLOCK PERIOD AND READING CONFIGURATION SIGNALS DURING SECOND CLOCK PERIOD

TECHNICAL FIELD OF THE INVENTION

This invention relates generally to the field of electronic communications and more specifically to the transfer of identification data from a subunit to a base unit.

BACKGROUND OF THE INVENTION

It has been heretofore known to serially link a number of independent devices or units in a manner that will permit the units to evoke a message depending up on the order in which they are linked. Typically, one of the units is a command or base unit. The rest of the units are peripheral units or subunits. It may be further desired to transmit to the base unit the identity of each subunit as well as the order in which the subunits are connected.

An example of such a serially linked system is a child's educational toy in the form of a train whose cars represent letters of the alphabet and can be interchanged to form words. The base unit, or engine, collects data from each car and emits a response appropriate to whether a word has been correctly spelled.

Another example is a computer system coupled to a group of serially linked peripheral devices, such as data collection devices, printers or storage devices. The computer system collects data from each device to determine which devices are present and in what order.

Various schemes have been heretofore developed which use a number of data lines to allow the base unit and the subunits, coupled in a serial chain or train, to communicate with the base unit. Additionally, a number of power lines can be used to provide power from the base unit to the subunits. Typically, each subunit is equipped with two connectors, and the base unit with one connector. These connectors couple the data and power lines from the base unit to the first subunit, and from each subunit to the next subunit.

A problem with this coupling scheme is that the combined number of data and power lines is often more than standard, off-the-shelf connectors can accommodate. Therefore, custom made connectors must be used in place of off-the-shelf connectors. A need thus exists for a data and power connection scheme that minimizes the number of lines.

SUMMARY OF THE INVENTION

In accordance with the present invention, a unit train is provided. The unit train includes a base unit. The base unit generates a clock signal and a bit signal. The base unit also receives and interprets a data signal. The unit train also includes a plurality of subunits, serially coupled in a certain order. Each subunit receives the clock signal and the bit signal. Each subunit also generates a portion of the data signal. Additionally each of the subunits has a corresponding identity. Also included in the unit train is a clock/data line for relaying the clock signal and the data signal between the base unit and each subunit.

One technical advantage of the invention is that the base unit determines the identity of each subunit with a minimum of connection lines between the base unit and the subunit.

A further advantage is that the base unit determines the order in which the subunits are coupled with a minimum of connection lines between the base unit and the subunit.

BRIEF DESCRIPTION OF THE DRAWINGS

FIGS. 7a and 7b are a top view and a side view respectively of one embodiment of a male type connector of FIGS. 1 and 2;

FIGS. 8a and 8b are a top view and a side view respectively of one embodiment of a female type connector of FIGS. 1 and 2; and FIG. 9 is a slotted cylinder for coupling the connector of FIG. 7 to a subunit of FIGS. 1 and 2 and for coupling the connector of FIG. 8 to both a base unit and a subunit of FIGS. 1 and 2.

DETAILED DESCRIPTION OF THE INVENTION

Figure 1:
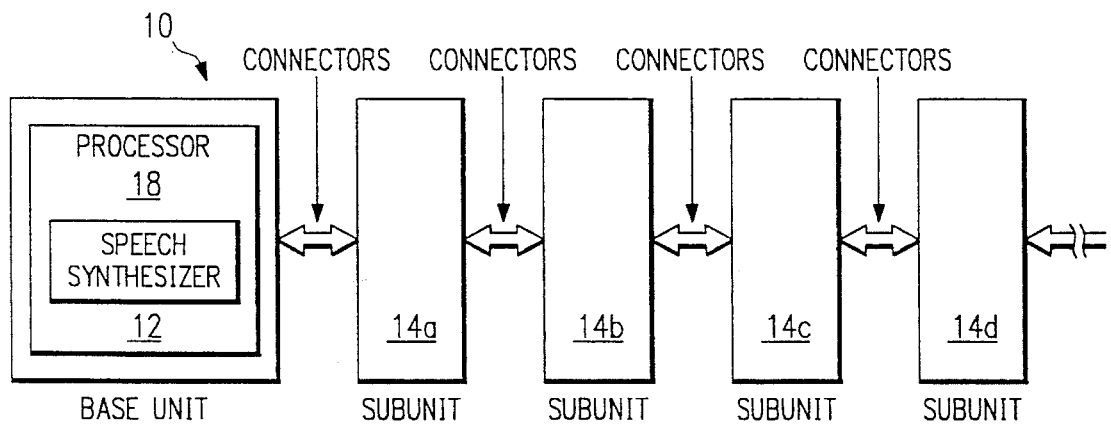
FIG. 1 is a unit train having a base unit and a number of subunits.

Referring to FIG. 1, a unit train 10 is shown having a base unit 12 and a number of subunits 14a–d coupled in a serial chain. Base unit 12 and subunits 14a–d are coupled to each other by connectors as shown. The connectors are of a type which allow easy removal and addition of base unit 12 or any subunit 14 from or to unit train 10.

Unit train 10 may be a child's learning toy, such as a string of beads or a "choo-choo" train having an engine and a number of cars. Other applications are also possible.

For many applications, base unit 12 must determine the identity of each subunit 14a–d and the order in which subunits 14a–d are coupled. For example, for a learning toy, the subunits 14 may each represent a letter of the alphabet, and base unit 12 may contain a processor 18, including a speech processor. Base unit 12 must determine the identity and order of each subunit 14a–d in order to determine whether a correctly spelled word has been formed, by interpreting signals received from the subunits 14a–d. The speech processor associated with processor 18 would then be used to generate appropriate sounds, such as speaking the correctly spelled word, or saying "try again" if the spelling was incorrect.

Figure 2:
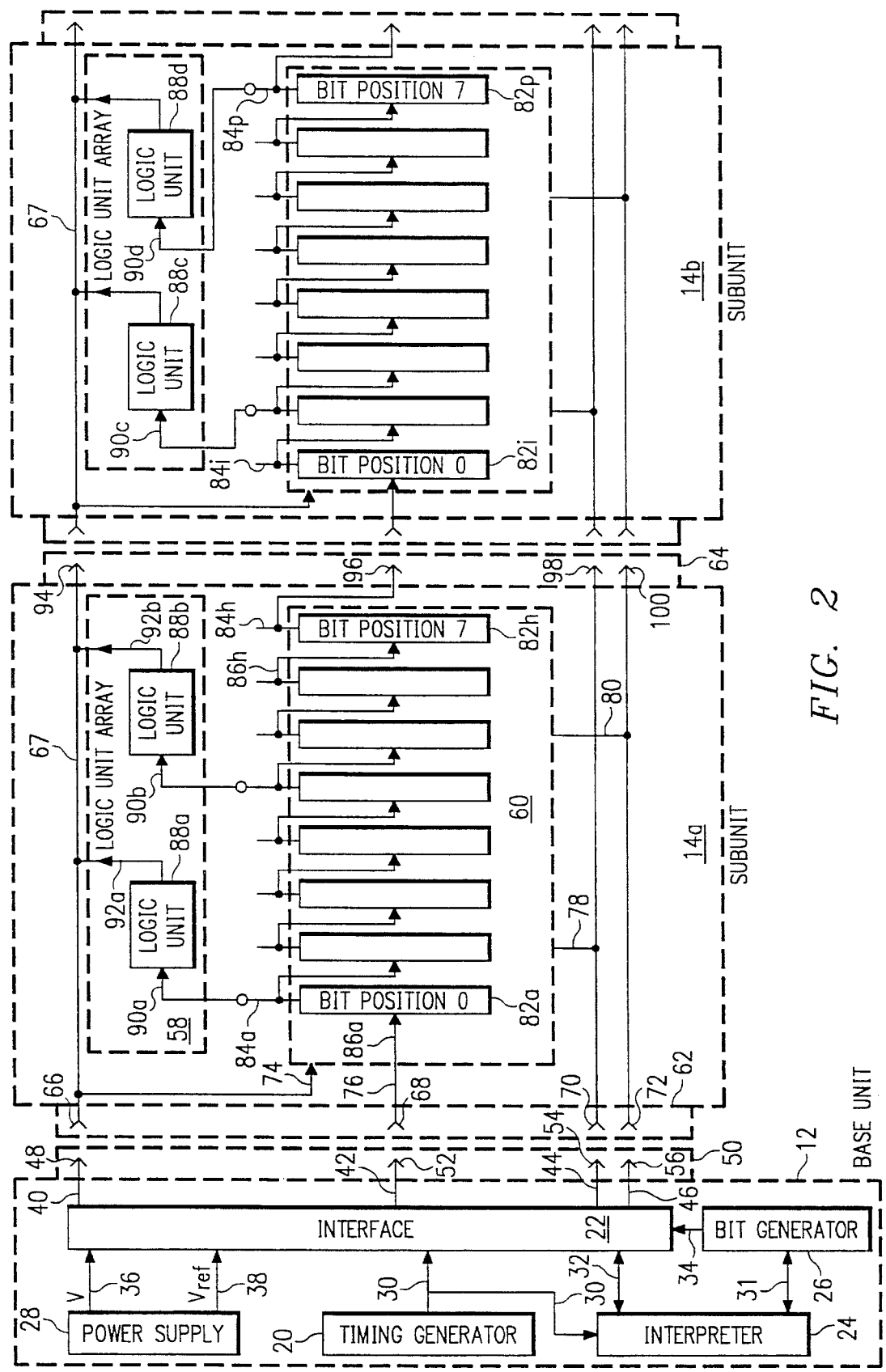
FIG. 2 is a block diagram of the internal components of the base unit and the subunits.

Referring to FIG. 2, base unit 12 and two subunits 14 of unit train 10 are shown in more detail. Within base unit 12, timing generator 20 and interface 22 are coupled by signal path 30. Interpreter 24 is coupled to interface 22 by signal path 32. Bit generator 26 and interface 22 are coupled by signal path 34. Power supply 28 is coupled to interface 22 by power path 36 and reference path 38. Bit generator 26 and interpreter 24 are coupled by path 31.

Interface 22 provides clock/data port 40, bit port 42, power port 44, and power reference port 46. Clock/data port 40 is coupled to clock/data terminal 48 of connector 50. Bit port 42 is coupled to bit terminal 52 of connector 50. Power port 44 is coupled to power terminal 54 and reference port 46 is coupled to reference terminal 56. Connector 50 is discussed in more detail below in conjunction with FIG. 8.

It is understood all subunits 14 are similar in construction and operation. For clarity, subunit 14a will be specifically discussed here, except where otherwise noted. Subunit 14a includes a logic unit array 58, serial-in-parallel-out shift register 60 and connectors 62 and 64. Connector 62 is made to mate or couple with a connector of the same type as connectors 50 and 64, which are of the same type. Connector 62 is discussed in more detail below in conjunction with FIG. 7. Specifically, connector 62 provides a clock/data terminal 66 which, when connector 62 is coupled to connector 50, is coupled to clock/data terminal 48. Terminal 66 is coupled to clock/data line 67. Connector 62 also provides bit terminal 68 for coupling to bit terminal 52, power terminal 70 for coupling to power terminal 54, and power reference terminal 72 for coupling to power reference terminal 56.

Shift register 60 provides a clock input terminal 74, a bit input terminal 76, a power terminal 78, and a reference terminal 80. Clock input terminal 74 is coupled to clock/data line 67. Bit input terminal 76 is coupled to bit terminal 68. Power terminal 78 is coupled to power terminal 70. Reference terminal 80 is coupled to reference terminal 72. Shift register 60 includes eight bit positions 82a–h. Each bit position 82 has an output terminal 84, and an input terminal 86. Input terminal 86a is coupled to bit input terminal 76. Input terminals 86b–h are coupled to output terminals 84a–g respectively. Additionally, a number of output terminals 84a–h are coupled to logic unit array 58. In this embodiment, output terminals 84a and 84e are coupled to logic unit array 58.

Logic unit array 58 includes from one to eight logic units 88. In this embodiment, logic unit array 58 is shown to include two logic units 88. Each logic unit 88 has a logic input terminal 90 and a logic output terminal 92. Each logic output terminal 92 is coupled to clock/data line 67. Each logic input terminal 90 is coupled to one of the bit position output terminals 84a–h. In s embodiment, logic input terminal 90a is coupled to output terminal 84a, and logic input terminal 90b is coupled to output terminal 84e. Connector 64 includes clock/data terminal 94, bit terminal 96, power terminal 98, and reference terminal 100. Clock/data terminal 94 is coupled to clock/data line 67. Bit terminal 96 is coupled to bit position output terminal 84h. Power terminal 98 is coupled to power terminal 70, and power reference terminal 100 is coupled to power reference terminal 72.

As discussed above, subunit 14b is equivalent to subunit 14a. The only difference is that in subunit 14b, logic unit input terminals 90c and 90d are coupled to different bit position output terminals 84i–p. Specifically, input terminal 90c is coupled to output terminal 84j, and input terminal 90d is coupled to output terminal 84p. This difference between the two subunits 14a and 14b indicates that each has a different identity. Identity of subunits 14 will be discussed in detail in conjunction with FIG. 4.

Figure 3:
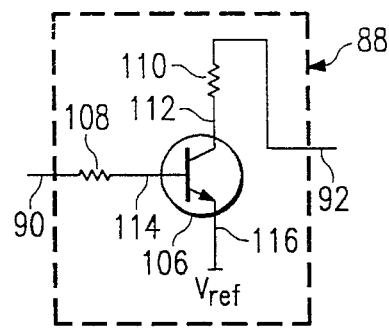
FIG. 3 is a more detailed view of a logic unit of FIG. 2.

FIG. 3 is a detailed view of a logic unit 88. Logic unit 88 includes an NPN bipolar transistor 106, a base resistor 108 and a collector resistor 110. Transistor 106 provides a collector 112, a base 114, and an emitter 116. Collector 112 is coupled to a first terminal of resistor 110. A second terminal of resistor 110 is coupled to logic output terminal 92. Emitter 116 is coupled to reference voltage $V_{ref}$ by way of reference terminal 72. For clarity, emitter 116 is shown coupled to voltage $V_{ref}$ in FIG. 3. Base 114 is coupled to a first terminal of resistor 108. A second terminal of resistor 108 is coupled to logic input terminal 90.

In operation, power supply 28 generates a voltage V on power path 36 which is transmitted to subunits 14 via power terminal 54. Power supply 28 also generates a reference voltage $V_{ref}$ on reference path 38 which is transmitted to subunits 14 via power reference terminal 56. In this embodiment, $V_{ref}$ is ground or zero volts, and V is approximately five volts.

Figure 4:
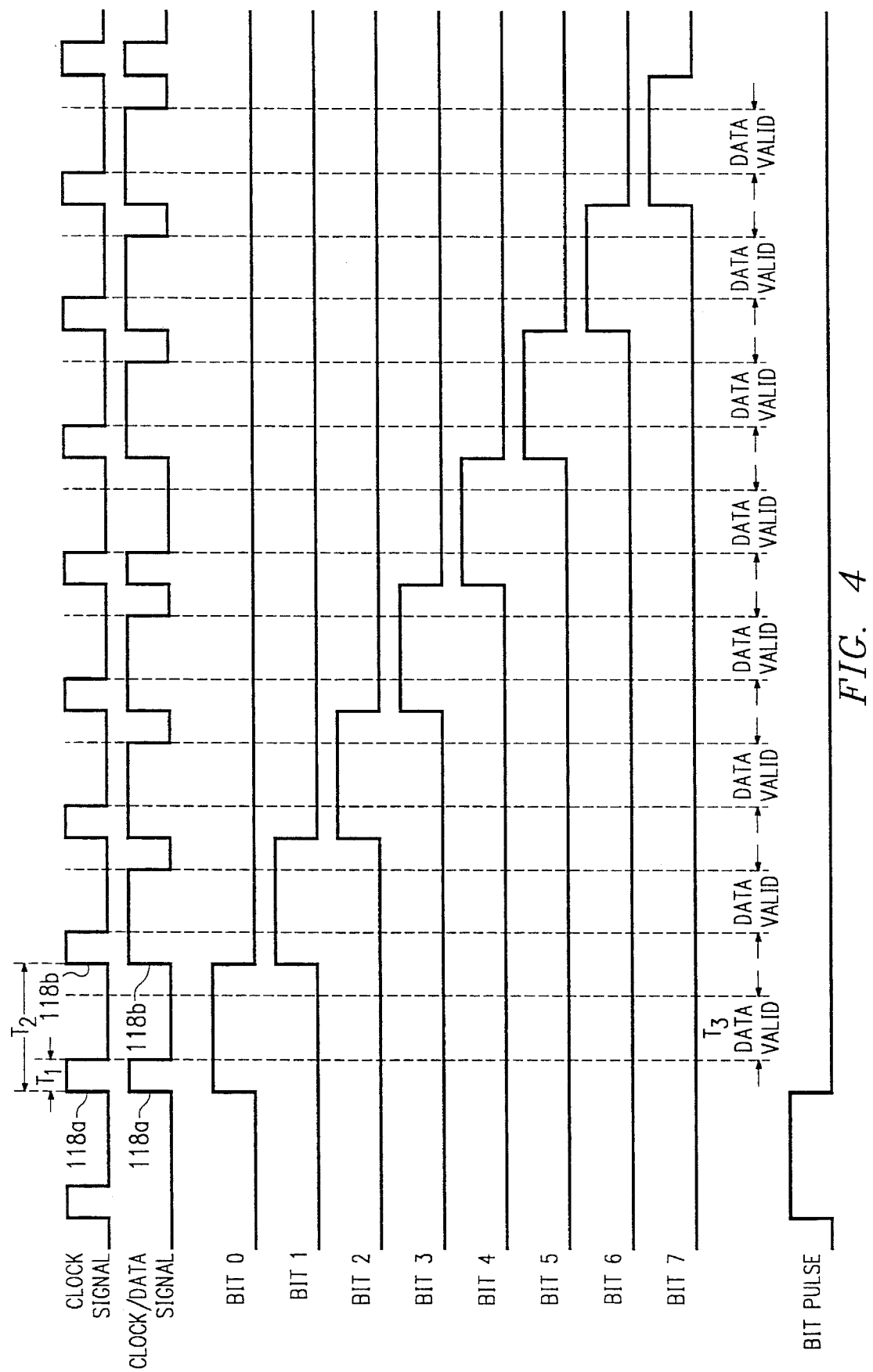
FIG. 4 is a timing diagram for the clock signal, clock data signal, bit signal and the contents of bit positions 0–7.

Referring to FIG. 4, a clock signal and a data signal are time multiplexed on clock/data line 67 to form a clock/data signal. Timing generator 20 generates the clock signal on path 30. The clock signal has a period of $T_2$ and a pulse of duration $T_1$. Interpreter 24 receives the clock signal via path 30. At sometime later, interpreter 24 signals bit generator 26 via path 31 to generate a bit signal, as shown in FIG. 4. This bit signal, representing a logic "one" in this embodiment, is transmitted to interface 22 via path 34. The bit signal is then directed via bit port 42, bit terminal 52 and bit terminal 68 to bit input terminal 76 of shift register 60. Interpreter 24 next signals interface 22 via path 32 to couple the clock signal to clock/data line 67 via clock/data port 40.

The clock signal is coupled via clock/data line 67 to clock input terminal 74 of shift register 60. On the rising edge 118a of the clock signal, the bit pulse, or a logic "one" is loaded into bit position 82a. A logic "one" next appears at output terminal 84a and logic unit input terminal 90a. The voltage level associated with the logic "one" approximately five volts in this embodiment, switches "on" transistor 106. Transistor 106, acting as a closed switch, couples voltage $V_{ref}$ to clock/data line 67 via resistor 110 and logic unit output terminal 92a. However, the clock signal is of sufficient power to maintain a pulse for the duration of time $T_1$.

After time $T_1$ has elapsed, interpreter 24 signals interface 22 to disconnect the clock signal from clock/data port 40 and clock/data line 67 for a time $T_3$. During time $T_3$, the data signal generated by logic unit 88a is valid. That is, there are no other signals present on the clock/data line 67. During time $T_3$, interpreter 24 determines whether or not a logic unit 88 is coupled to output 84a. In this example, interpreter 24 determines that logic unit 88a is coupled to output 84a. This determination results from logic unit 88a having generated a logic "zero" on clock/data line 67. That is, the logic "zero" generated by logic unit 88a signals the interpreter that logic unit 88a is coupled to output 84a.

After the elapse of time $T_3$, interpreter 24 signals interface 22 to connect the clock signal to clock/data port 40 and clock/data line 67. The bit, or logic "one" in bit position 82a is now shifted, or loaded, into bit position 82b on the rising edge 118b of the clock signal. Again, interpreter 24 determines whether or not a logic unit 88 is coupled to output 84b. In this example, there is no logic unit 88 coupled to output 84b. Interpreter recognizes the absence of a logic unit 88 by sensing a high level, or logic "one", on the clock/data line 67 during time $T_3$ of the second period $T_2$ of the clock signal.

This sequence continues until the bit signal has been shifted through each of the eight bit positions 82a–h. The combination of all the signals generated by any logic unit array, such as logic unit array 58, is the identification, or sequence, signal of the corresponding subunit 14. The combination of all the sequence signals forms the data signal interpreted by interpreter 24. Thus, the logic unit array of each subunit 14 generates a portion of the data signal when there are multiple subunits in unit train 10. The bit pulse is then shifted from bit position 82h to the first bit position of the next coupled subunit, here, bit position 82i of subunit 14b. The procedure is then repeated for each subsequent subunit 14 until the end of the unit train is reached. Interpreter 24 senses the end of the unit train 10 when it senses a logic "one" for the next eight bit positions 82 after the previous subunit. That is, the absence of logic units 88 where a subunit 14 is expected indicates the previous subunit 14 was the last in unit train 10.

Interpreter 24, using the above described procedure, determines the identity of each subunit 14 and the order of coupling. The identity of each subunit 14 is represented by the corresponding identification, or sequence, signal. The sequence signal represents the number of logic units 88 within a subunit 14 and to which outputs 84 each logic unit 88 is connected. For example, logic units 88a and 88b are coupled to bit positions 82a and 82e in subunit 14. In this example, 82a represents the least significant bit and 82h the most significant bit of an eight bit binary number. Each bit position 82 to which a logic unit 88 is coupled is considered a logic "one", the remaining considered as logic "zero". Therefore, the eight bit binary identification number associated with subunit 14a is 00010001 binary, decimal 17, and hexadecimal 11. Additionally, interpreter 24 receives this identification number, as the identification or sequence signal, first. Therefore, interpreter 24 determines that a subunit 14a has an identification number of 17 decimals and is the first subunit in unit train 10.

An example of an application is the child's learning toy as discussed above. The toy is in the form of a "choo-choo" train. Base unit 12 is the engine of the train, and subunits 14 are the cars which the engine pulls. In this example, every subunit 14 having an identification number of decimal 17 represents letter "S". To facilitate explanation, such a subunit 14 is assumed to be the first subunit 14a coupled to the train engine, or base unit 12. Interpreter 24 would determine here that the first subunit 14a in unit train 10 is the letter "S". By determining the order and identity of the remaining subunits 14, interpreter 24 determines whether or not a correctly spelled word has been formed by unit train 10. If a correctly spelled word has been formed, a speech synthesizer in processor 18 is used to force the engine, or base unit 12, to "speak" the correctly spelled word. If a correctly spelled word has not been formed, the words "try again", or another appropriate phrase, will be "spoken" by the train engine.

In this embodiment, there are 255 possible identification numbers. To utilize all 255 numbers, up to eight logic units 88 would be needed per subunit 14. In other embodiments, the number of possible identification numbers could be increased by adding more bit positions 82 and more logic units 88. In this embodiment, with eight bit positions 82 and up to two logic units 88 per logic unit array 58, there are 36 possible identification numbers.

Figure 5:
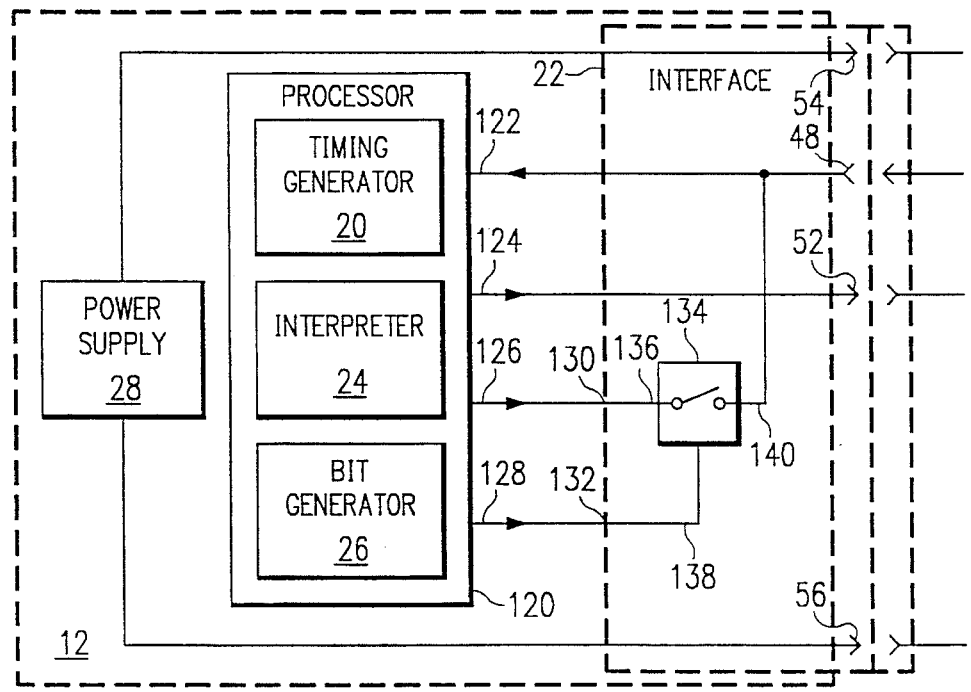
FIG. 5 is an alternate embodiment of the base unit of FIG. 1.

Referring to FIG. 5, an alternate embodiment of base unit 12 is shown, in which base unit 12 has a microprocessor 20. Base unit 12 also includes power supply 28 and interface 22.

Microprocessor 120 includes and performs the functions of timing generator 20, interpreter 24, and bit generator 26. Microprocessor 120 further includes a clock/data terminal 122, a bit terminal 124, a clock signal terminal 126, and a control signal terminal 128. Clock/data terminal 122 is coupled via interface 22 and clock/data terminal 66 of connector 62 to clock/data line 67. Bit terminal 124 is coupled via interface 22 to bit terminal 68. Clock signal terminal 126 is coupled to switch input terminal 130 of interface 22. Control terminal 128 is coupled to switch control terminal 132 of interface 22.

Interface 22 includes a switch 134, having an input terminal 136, a control terminal 138, and an output terminal 140. Input terminal 136 is coupled to switch input terminal 130. Control terminal 138 is coupled to switch control terminal 128. Output terminal 140 is coupled via clock/data port 40 and clock/data terminal 66 of connector 62 to clock/data line 67.

The operation of base unit 12 of FIG. 5 is the same as described above with respect to FIG. 1. However, during time $T_1$, microprocessor generates a first state of a control signal at terminal 128 which causes switch 134 to close, thereby coupling the clock signal to clock/data port 40 and clock/data line 67. During time $T_3$, microprocessor 120 generates a second state of the control signal which causes switch 134 to open, thereby uncoupling the clock signal from the clock/data port 40 and clock/data line 67.

Figure 6:
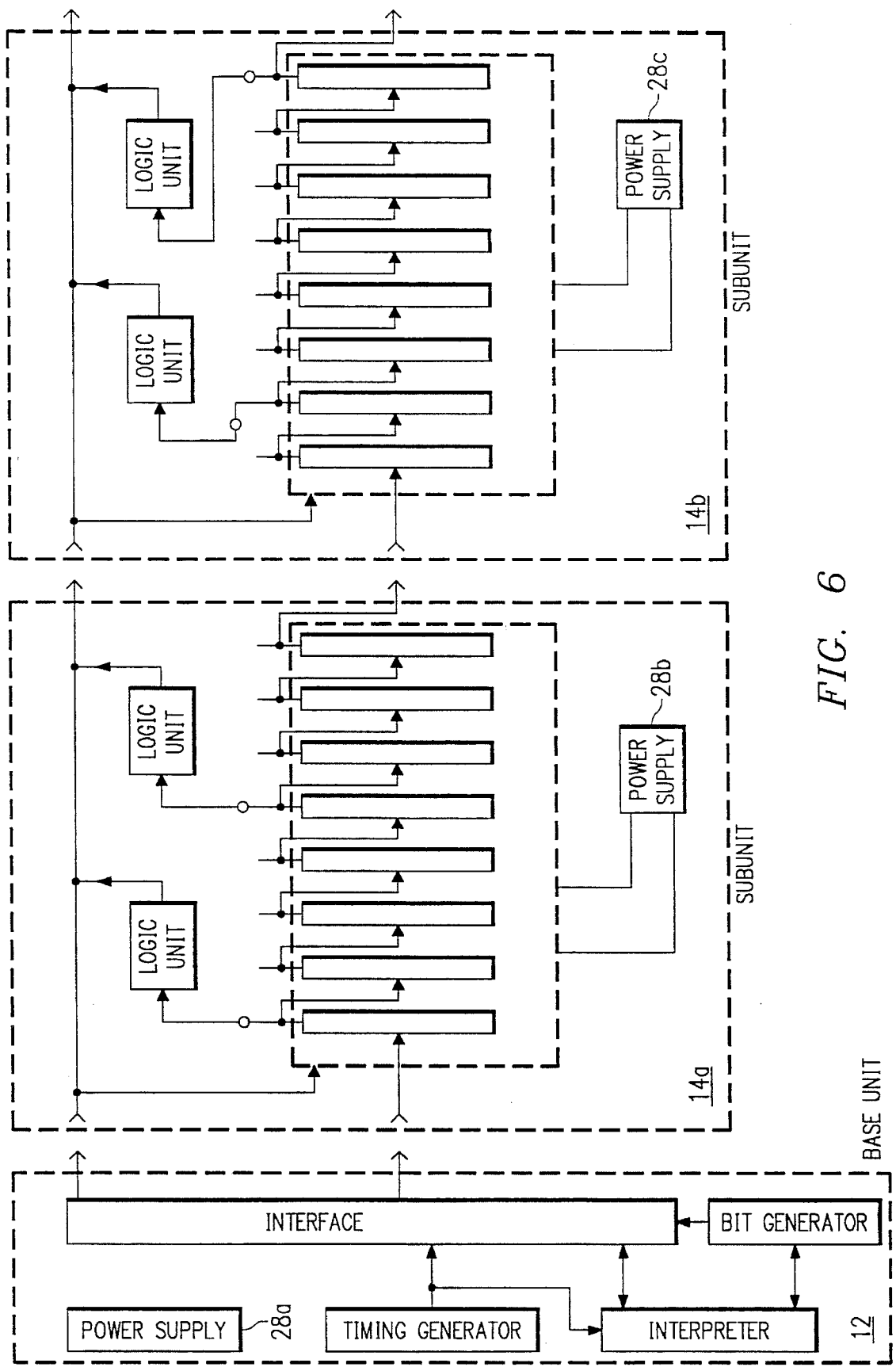
FIG. 6 is an alternate embodiment of the unit train of FIG. 1.

FIG. 6 shows an alternative embodiment of unit train 10. Base unit 12, as well as each subunit 14, includes a power supply 28. As a result of each subunit 14 having a power supply 28, the number of terminals on each connector 62 and 64 is reduced from four to two. In other aspects, this alternative embodiment is equivalent to the embodiment of FIG. 2.

FIGS. 7a and 7b show a top view and a side view respectively of one embodiment of connector 62. This embodiment of connector 62 is particularly suited for use in the child's toy as discussed above. Connector 62 is a male type connector having a housing 142 for holding a jack or conductor head 144.

Housing 142 provides four protrusions or pegs 146a–d for movably coupling housing 142 to the input side of a subunit 14. This coupling will be discussed in more detail below in conjunction with FIG. 9. Housing 142 also provides an opening 148 for receiving conducting wires 150a–d from the inside of a subunit 14.

Jack head 144 provides four conductors which form terminals 66, 68, 70 and 72. This embodiment shows one ordering of terminals 66–72 on jack head 144, although other embodiments may have other orderings. Jack head 144 also provides three insulators 152a–c for preventing short circuits between any two or more of terminals 66–72.

One of wires 150a–d is coupled between a corresponding pair of terminals 66–72 and 74–80. In this embodiment, wire 150a is coupled between terminals 66 and 74, wire 150b is coupled between terminals 68 and 76, wire 150c is coupled between terminals 70 and 78, and wire 150d is coupled between terminals 72 and 80.

FIGS. 8a and 8b show a top view and a side view respectively of one embodiment of connector 50. This embodiment of connector 50 is particularly suited for use in the child's toy discussed above. Connector 50 is a female type connector having a receptacle 154 for receiving jack head 144.

Connector 50 has a receptacle housing 156 providing four protrusions or pegs 158a–d for movably coupling housing 156 to either the base unit 12 or the output side of a subunit 14. Pegs 158a–d are similar, if not identical, to pegs 146a–d. Receptacle 154 is housed within receptacle housing 156 and provides four conductive spring clips, one end of each which form terminals 48–56 of base unit 12 or which form terminals 94–100 of a subunit 14. Receptacle 154 also houses opening 162 for receiving one of the ends of each spring clip 160a–d.

Each of the other ends of the spring clips are coupled to a corresponding one of the terminals 48–56 if connector 50 is installed in base unit 12, or to a corresponding one of the terminals 74, 84h, 98, and 100 if connector 50 is installed in a subunit 14.

In operation, jack head 144 is inserted into receptacle 154 to form an electrical connection between connectors 50 and 62. If connector 50 is coupled to base unit 12, then the connection couples terminal 48 to terminal 66, terminal 52 to terminal, terminal 54 to terminal 70, and terminal 56 to terminal 72. If connector 50 is coupled to a subunit 14, then the connection couples terminal 94 to terminal 66, terminal 96 to terminal 68, terminal 98 to terminal 70, and terminal 100 to terminal 72.

FIG. 9 is a slotted cylinder 164 for coupling either housing 142 or housing 156 to base unit 12 or a subunit 14. In this embodiment, slotted cylinder 164 is molded into base unit 12 or a subunit 14. For clarity, only engagement to housing 142 will be discussed, it being understood that this discussion applies equally to an engagement with housing 156.

Cylinder 164 is comprised of two halves as shown by cut line 166. A top half includes a slot 168a, as well as half of slots 168b and 168d. A bottom half includes slot 168c, as well as the remaining halves of slots 168b and 168d. In this embodiment, housing 142 is placed inside cylinder 164, before the two halves are attached together, so that each peg 146a–d is aligned with a corresponding slot 168a–d. In other embodiments, pegs 146a–d may be aligned with a different slot 168a–d. Once pegs 146a–d are aligned with slots 168a–d, the two halves are attached. Each peg 146a–d protrudes through a corresponding slot 168a–d. Thus, housing 142 is movably attached within cylinder 164. Housing 142 is free to rotate through a first predetermined arc along a first axis created by pegs 146a and 146c with respect to cylinder 164. Housing 142 is also free to rotate through a second predetermined arc along a second axis created by pegs 146b and 146c with respect to cylinder 164.

Although the present invention and its advantages have been described in detail, it should be understood that various changes, substitutions and alterations can be made therein without departing from the spirit and scope of the invention as defined by the appended claims.

What is claimed is:

1. A unit train comprising:
   a base unit comprising
     a bit generator for generating a bit pulse,
     a clock for generating a clock signal having first and second clock periods,
     a bit signal line and a single clock/data line, and
     an interpreter circuit coupled to the bit generator and the clock and responsive to couple the bit generator to output a ONE bit pulse on the bit signal line, and afterward responsive during the first clock period to couple the clock signal as output to the clock/data line only during the first clock period, and during the second period to couple itself to the clock/data line for input only of a subunit configuration data signal; and
   a plurality of subunits responsive to the bit generator and clock for generating the subunit configuration data signal, each subunit comprising
     a shift register having N bit positions, coupled in parallel to the clock and in series to the bit signal line, and
     a logic unit coupled for input to the shift register at preselected bit positions identifying the particular subunit and coupled in parallel for outputting a ZERO on the clock/data line during the second clock period whenever there is a ONE in any of the preselected bit positions of the shift register.

2. The unit train of claim 1 wherein said base unit further comprises an interface for periodically uncoupling said clock signal from said clock/data line such that said base unit receives said data signal when said clock signal is uncoupled from said clock/data line.

3. The unit train of claim 2 wherein said interface device comprises a switch, responsive to said interpreter, for periodically uncoupling said clock signal from said clock/data line.

4. The unit train of claim 1 wherein the base unit further comprises an interpreter, responsive to said data signal, for determining said corresponding identity of each of said plurality of subunits and for determining said certain order.

5. The unit train of claim 1 wherein each of said plurality of subunits further comprises:
   a register circuit for receiving said bit signal; and
   a logic unit array, responsive to said register circuit, for generating said portion of said data signal.

6. The unit train of claim 5 wherein said register circuit comprises a shift register, responsive to said clock signal and having a plurality of bit positions, for shifting said bit signal through said plurality of bit positions.

7. The unit train of claim 6 wherein said shift register shifts said bit signal from a last one of said plurality of bit positions to a first one of a plurality of bit positions of a second shift register in a second one of said plurality of subunits.

8. The unit train of claim 6 wherein said logic unit array comprises at least one logic unit responsive to one of said plurality of bit positions to generate said portion of said data signal.

9. The unit train of claim 8 wherein said at least one logic unit comprises a switch for generating said portion of said data signal by coupling a reference voltage to said clock/data line.

10. A method for using a number of subunits, serially coupled in a certain order, each subunit having a certain identity, to determine the certain order and the certain identity of each subunit comprising the steps of:
   providing a bit generator for generating a bit pulse;
   providing a clock for generating a clock signal having first and second clock periods;
   providing a bit signal line and a single clock/data line;
   providing an interpreter circuit coupled to the bit generator and the clock and responsive to couple the bit generator to output a ONE bit pulse on the bit signal line, and afterward responsive during the first clock period to couple the clock signal as output to the clock/data line only during the first clock period, and during the second period to couple itself to the clock/data line for input only of a subunit configuration data signal; and
   providing a plurality of subunits responsive to the bit generator and clock for generating the subunit configuration data signal.

11. The method of claim 10, wherein each subunit comprises a shift register having N bit positions, coupled in parallel to the clock and in series to the bit signal line.

12. A method for using a number of subunits, serially coupled in a certain order, each subunit having a certain identity, to determine the certain order and the certain identity of each subunit comprising the steps of:
   providing a bit generator for generating a bit pulse;
   providing a clock for generating a clock signal having first and second clock periods;

providing a bit signal line and a single clock/data line;

providing an interpreter circuit coupled to the bit generator and the clock and responsive to couple the bit generator to output a ONE bit pulse on the bit signal line, and afterward responsive during the first clock period to couple the clock signal as output to the clock/data line only during the first clock period, and during the second period to couple itself to the clock/data line for input only of a subunit configuration data signal; and providing a plurality of subunits responsive to the bit generator and clock for generating the subunit configuration data signal, each subunit comprising a shift register having N bit positions, coupled in parallel to the clock and in series to the bit signal line, and a logic unit coupled for input to the shift register at preselected bit positions identifying the particular subunit and coupled in parallel for outputting a ZERO on the clock/data line during the second clock period whenever there is a ONE in any of the preselected bit positions of the shift register.

* * * * *